(12) United States Patent
Odaira et al.

(10) Patent No.: US 7,613,833 B2
(45) Date of Patent: Nov. 3, 2009

(54) DATA PROCESSING APPARATUS AND DATA PROCESSING METHOD, AND COMPUTER PROGRAM

(75) Inventors: Masahiro Odaira, Kanagawa-ken (JP); Fumio Shoji, Kanagawa-ken (JP); Takao Ikuno, Kanagawa-ken (JP); Yoshiaki Katahira, Kanagawa-ken (JP); Toru Fujino, Saitama-ken (JP); Kenji Kasuya, Kanagawa-ken (JP); Noritsugu Okayama, Kanagawa-ken (JP); Yasuhito Niikura, Chiba-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 717 days.

(21) Appl. No.: 10/536,874
(22) PCT Filed: Mar. 17, 2005
(86) PCT No.: PCT/JP2005/005443

§ 371 (c)(1),
(2), (4) Date: May 27, 2005

(87) PCT Pub. No.: WO2005/094056

PCT Pub. Date: Oct. 6, 2005

(65) Prior Publication Data

US 2006/0149835 A1    Jul. 6, 2006

(30) Foreign Application Priority Data

Mar. 25, 2004    (JP) .............................. 2004-090059

(51) Int. Cl.
*G06F 15/173* (2006.01)
*G06F 15/16* (2006.01)
*G06F 15/00* (2006.01)

(52) U.S. Cl. ........................ 709/246; 709/224; 358/1.16
(58) Field of Classification Search .................. 709/206, 709/205, 224, 246; 358/1.15–1.16
See application file for complete search history.

(56) References Cited

U.S. PATENT DOCUMENTS 5,717,842 A     2/1998   Ambalavanar et al. ...... 395/115
5,877,864 A *   3/1999   Sumida et al. ............. 358/1.16
5,884,014 A     3/1999   Huttenlocher et al. ...... 358/1.15

(Continued)

FOREIGN PATENT DOCUMENTS

JP              7-7623          1/1995

(Continued)

OTHER PUBLICATIONS

Japanese Office Action dated Mar. 24, 2008 in Japanese application No. 2004-090059.

(Continued)

*Primary Examiner*—Nathan J Flynn
*Assistant Examiner*—Joshua Joo
(74) *Attorney, Agent, or Firm*—Fitzpatrick, Cella, Harper & Scinto

(57) ABSTRACT

This invention efficiently implements encoding processes corresponding to respective image processing functions while minimizing the memory use size in the apparatus in an image processing apparatus having many image processing functions. A data processing apparatus of this invention includes a data reception unit for receiving at least data of a first format for respective pages, a data conversion unit for converting the data of the first format into data of a second format, a page data management unit for managing the data of the first and second formats in first and second page data in association with each other, and a control unit for monitoring a storage state of the data of the first format in the memory, and permitting a predetermined process for the data of the first format in accordance with the storage state. When the control unit determines that storage of the data of the first format in the memory is complete, the control unit permits the data conversion unit to start a data conversion operation from the first format to the second format. Also, the control unit monitors completion of the conversion operation of the data conversion unit and a storage state of the data of the second format in the memory, and permits a predetermined process for the data of the second format in accordance with the storage state.

4 Claims, 13 Drawing Sheets

U.S. PATENT DOCUMENTS

| | | | |
|---|---|---|---|
| 6,032,147 A | 2/2000 | Williams et al. | |
| 6,490,597 B1 | 12/2002 | Singh et al. | |
| 6,523,046 B2 | 2/2003 | Liu et al. | 707/104.1 |
| 6,947,995 B2 | 9/2005 | Chang et al. | 709/231 |
| 7,162,053 B2 | 1/2007 | Camara et al. | 382/100 |
| 2002/0012453 A1* | 1/2002 | Hashimoto et al. | 382/112 |
| 2002/0051212 A1* | 5/2002 | Kobayashi | 358/261.2 |
| 2002/0076115 A1 | 6/2002 | Leeder et al. | 382/250 |
| 2002/0120634 A1 | 8/2002 | Min et al. | 707/200 |
| 2003/0081234 A1 | 5/2003 | Wiley | |
| 2003/0191871 A1 | 10/2003 | Tohki | |
| 2004/0083260 A1* | 4/2004 | Kobayashi et al. | 709/201 |
| 2004/0243648 A1* | 12/2004 | Hidaka et al. | 707/200 |
| 2006/0117053 A1 | 6/2006 | Niikura et al. | 707/102 |

FOREIGN PATENT DOCUMENTS

| | | |
|---|---|---|
| JP | 09-046490 A | 2/1997 |
| JP | 9-83769 | 3/1997 |
| JP | 9-93425 | 4/1997 |
| JP | 2000-115494 | 4/2000 |
| JP | 2001-45191 | 2/2001 |
| JP | 2001-144920 | 5/2001 |
| JP | 2002-77552 | 3/2002 |
| JP | 2002-300358 A | 10/2002 |
| JP | 2003-259097 | 9/2003 |

OTHER PUBLICATIONS

Office Action dated Dec. 11, 2008 in co-pending U.S. Appl. No. 10/536,866.

* cited by examiner

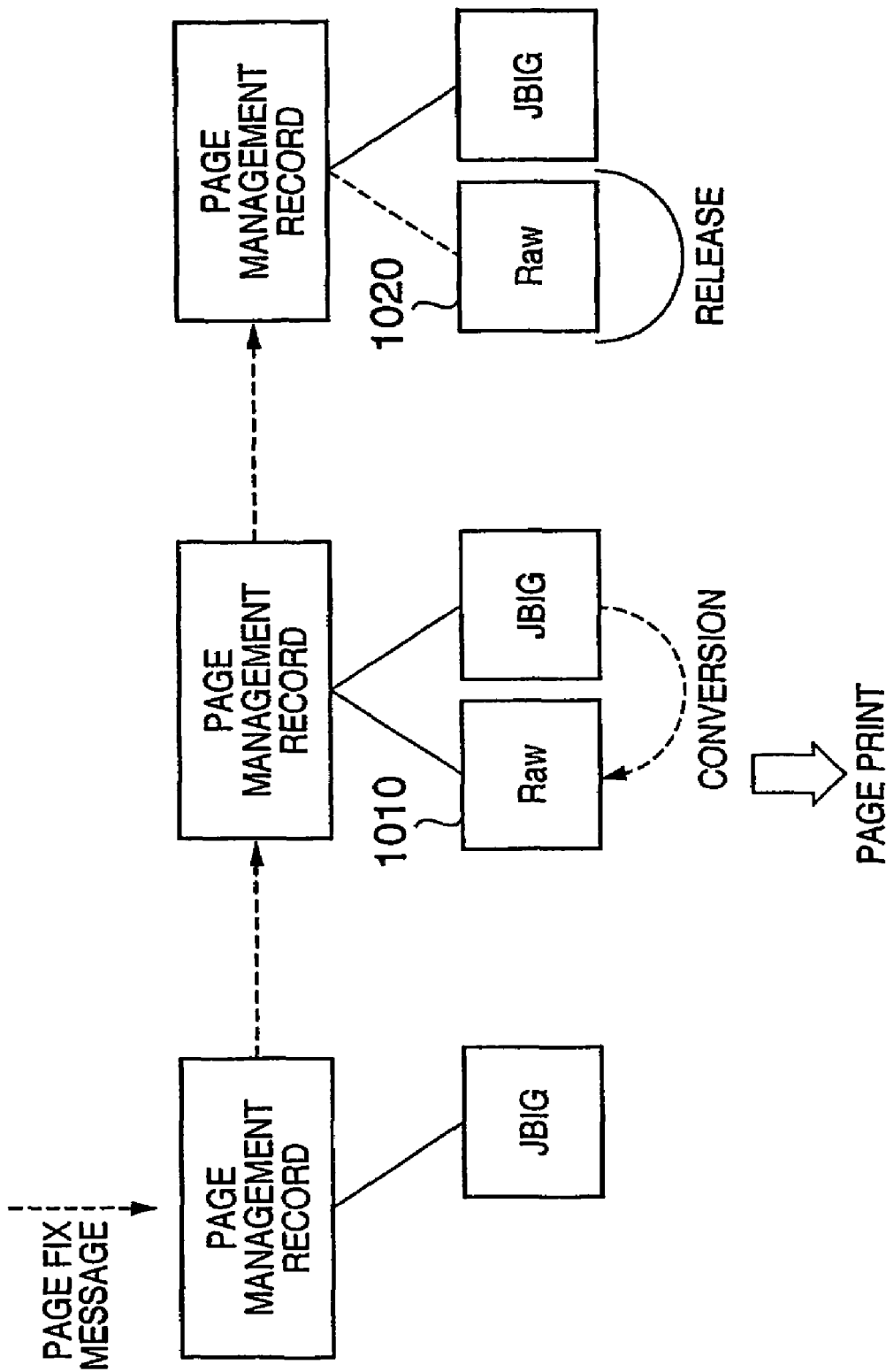

DATA PROCESSING APPARATUS AND DATA PROCESSING METHOD, AND COMPUTER PROGRAM

TECHNICAL FIELD

The present invention relates to a data processing apparatus and data processing method and, more particularly, to a management method of page data in a multi-function peripheral apparatus (to be referred to as an MFP apparatus hereinafter) that handles page data in a plurality of data formats.

BACKGROUND ART

In a conventional MFP apparatus which handles image data in a plurality of data formats, an image data input unit such as scanning, FAX reception, network reception, and the like encodes/decodes page data input from an input interface to that in a data format (encoding format) unique to the apparatus, and stores the page data in the apparatus as storage data.

Also, an image data output unit such as recording, FAX transmission, network transmission, and the like converts the storage data stored in the data format unique to the apparatus into a required data format, and outputs the converted data to an output interface. As described above, page data in different data formats (encoding formats), which are generated by the input and output units and are used, are independently managed.

FIG. 1 shows the structure of page management records in such conventional MFP apparatus. That is, an image (Raw data) scanned by an image reader (scanner) is encoded to JBIG as an encoding format unique to the MFP apparatus, and is stored in a memory as JBIG data. Upon using this JBIG data, it is converted into a data format (encoding format) required for a function to be used (e.g., a FAX transmission function), and the converted data is used. Therefore, the conventional MFP apparatus manages data to be handled in a single encoding format like, e.g., JBIG. As shown in FIG. 1, page management records 10a, 10b, . . . respectively manage only JBIG page data 20a, 20b . . . . Note that JBIG data is stored in a memory managed by the JBIG page data.

However, the conventional MFP apparatus manages and stores data in a common data format (JBIG format). When raw data is input and is immediately output (copied), raw data→JBIG conversion is purposely made, and a storage process is then executed. After that, since JBIG data→raw data re-conversion is made, a time loss for the storage process is produced, resulting in a low output speed.

In the conventional MFP apparatus, for example, when the first page is JBIG data, the second page is TXT data, and the third page is TIFF data in a single document, each page management record can only have page data in a specific data format unique to the apparatus, and cannot manage each page in an original encoding format. Hence, the image data output unit cannot use page data until the image data input unit completes encoding/decoding to storage data and generates page data, thus requiring a long processing time from input to output of image data.

If the conventional MFP apparatus supports and manages data in various different data formats (encoding formats), it must generate page data in different data formats (encoding formats) and must manage them independently although they form a single document, as shown in FIGS. 2A to 2C. That is, when the image data output unit (recording, FAX transmission, network transmission) that requires data format conversion must have page management records for page data conversion and page data themselves, and management is made in this way, the memory use size increases, resulting in high apparatus cost.

The present invention has been made to solve the aforementioned problems, and has as its object to provide a data process apparatus which can implement an encoding process which efficiently supports respective image processing functions while minimizing the memory use size in the apparatus.

DISCLOSURE OF INVENTION

According to one aspect of the present invention, preferably, a data processing apparatus for processing data for respective pages, comprises a data reception unit for receiving at least data of a first format for respective pages, a data conversion unit for converting the data of the first format into data of a second format, a page data management unit for managing the data of the first and second formats in first and second page data in association with each other and a control unit for monitoring a storage state of the data of the first format in a memory, and permitting a predetermined process for the data of the first format in accordance with the storage state.

According to another aspect of the present invention, preferably, a data processing method for processing data for respective pages, comprises a data reception step of receiving at least data of a first format for respective pages, a first page data generation step of generating first page data used to manage the data of the first format, a control step of monitoring a storage state of the data of the first format in the memory, and permitting a predetermined process for the data of the first format in accordance with the storage state, a data conversion step of converting the data of the first format into data of a second format, a second page data generation step of generating second page data used to manage the data of the second format and a page data management step of managing the data of the first and second formats in first and second page data in association with each other.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 13 is a view showing the concept of still another page data control operation.

BEST MODE FOR CARRYING OUT THE INVENTION

An MFP (multi-function peripheral) apparatus will be exemplified hereinafter in association with a data processing apparatus according to the present invention.

<Hardware Arrangement>

Figure 1:
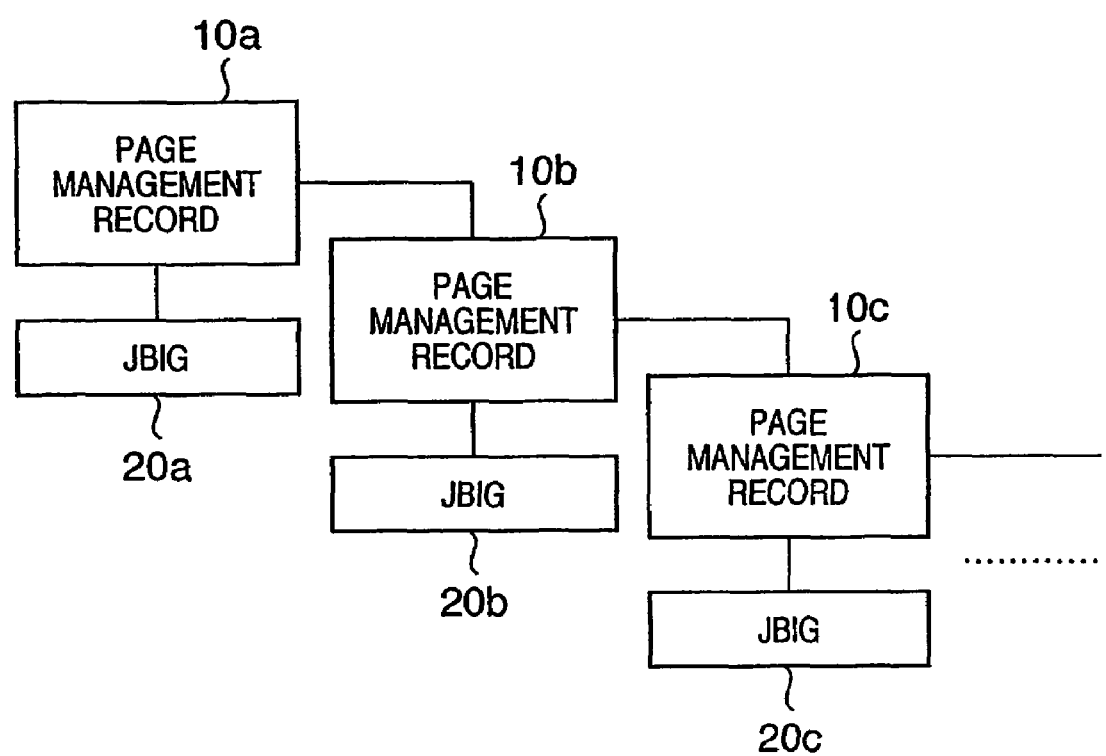
FIG. 1 shows the structure of page management records in the conventional MFP apparatus.
Figure 2A:
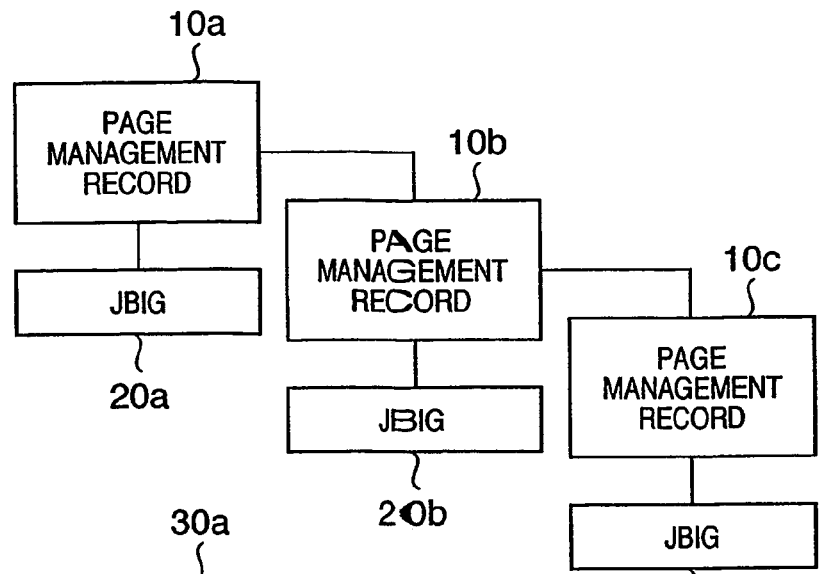
FIGS. 2A to 2C are schematic views showing the page data management method when the conventional MFP apparatus supports and manages data in various different data formats (encoding formats)
Figure 2B:
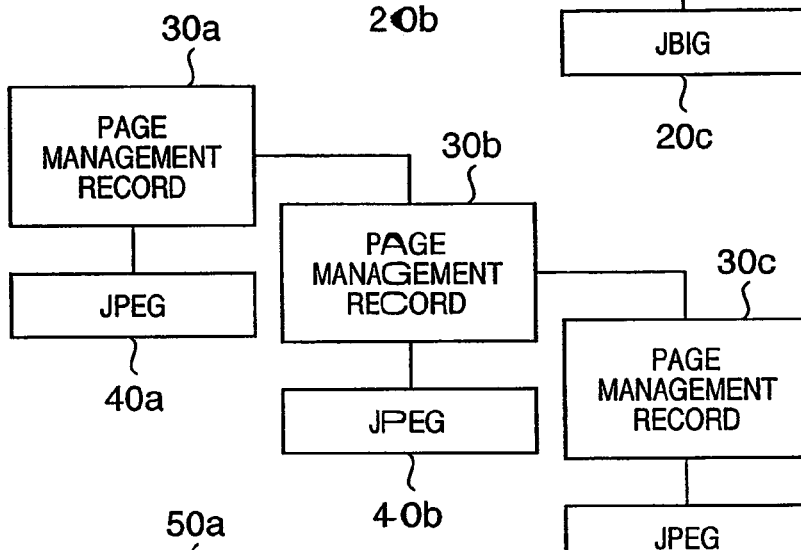
Figure 2C:
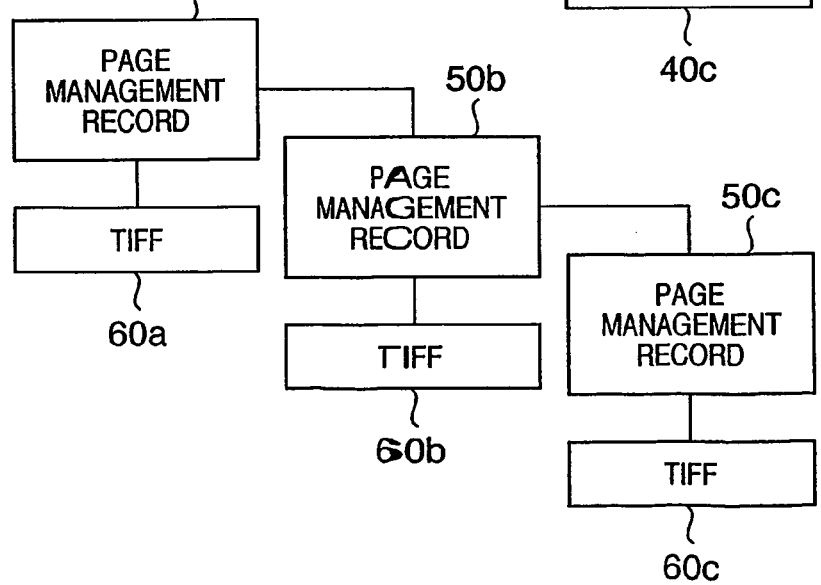
Figure 3:
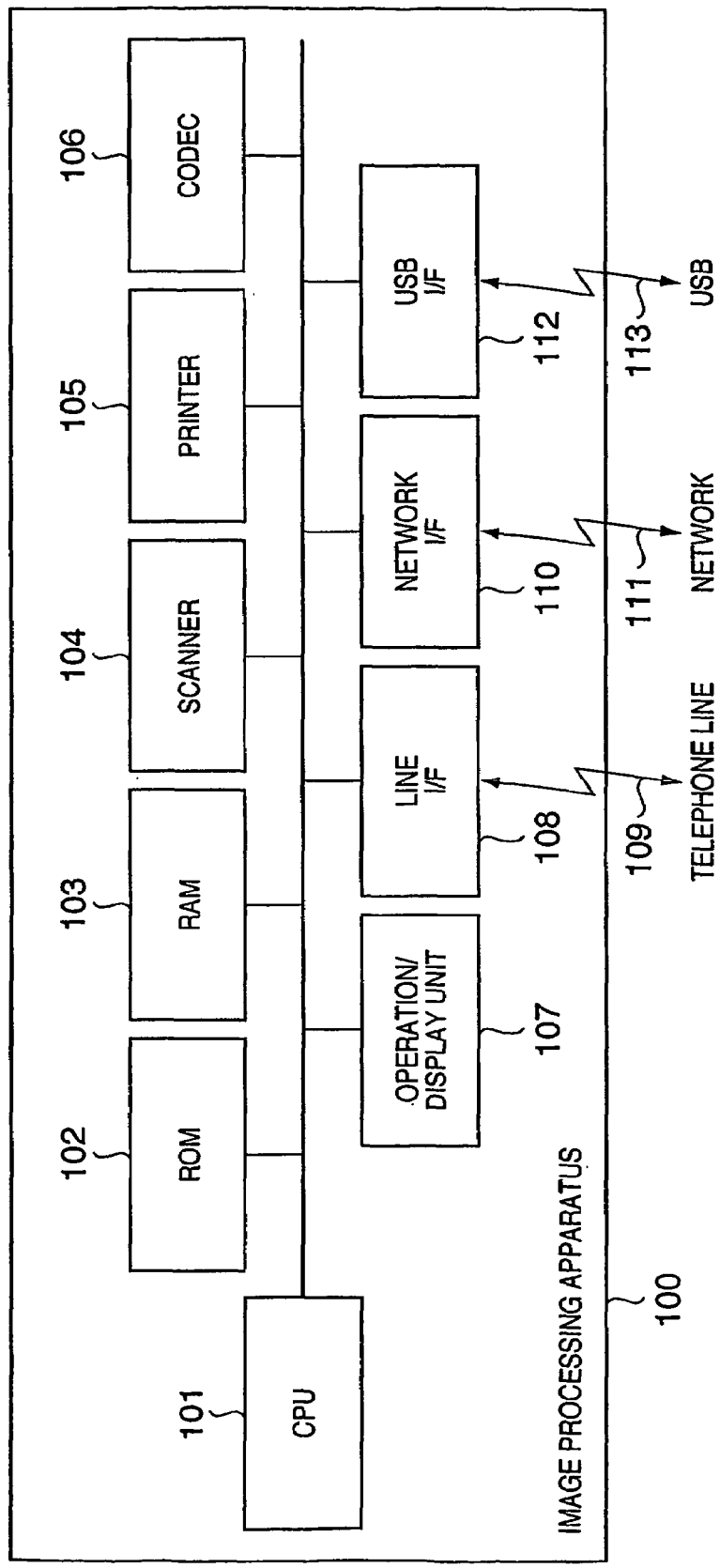
FIG. 3 is a block diagram showing the arrangement of an image processing apparatus 100 according to the present invention.

FIG. 3 is a block diagram showing the arrangement of an image processing apparatus as an embodiment of the present invention.

Referring to FIG. 3, an image processing apparatus 100 has a CPU 101, ROM 102, RAM 103, scanner 104, printer 105, CODEC 106, operation/display unit 107, line I/F 108, network I/F 110, and USB I/F 112.

Figure 9:
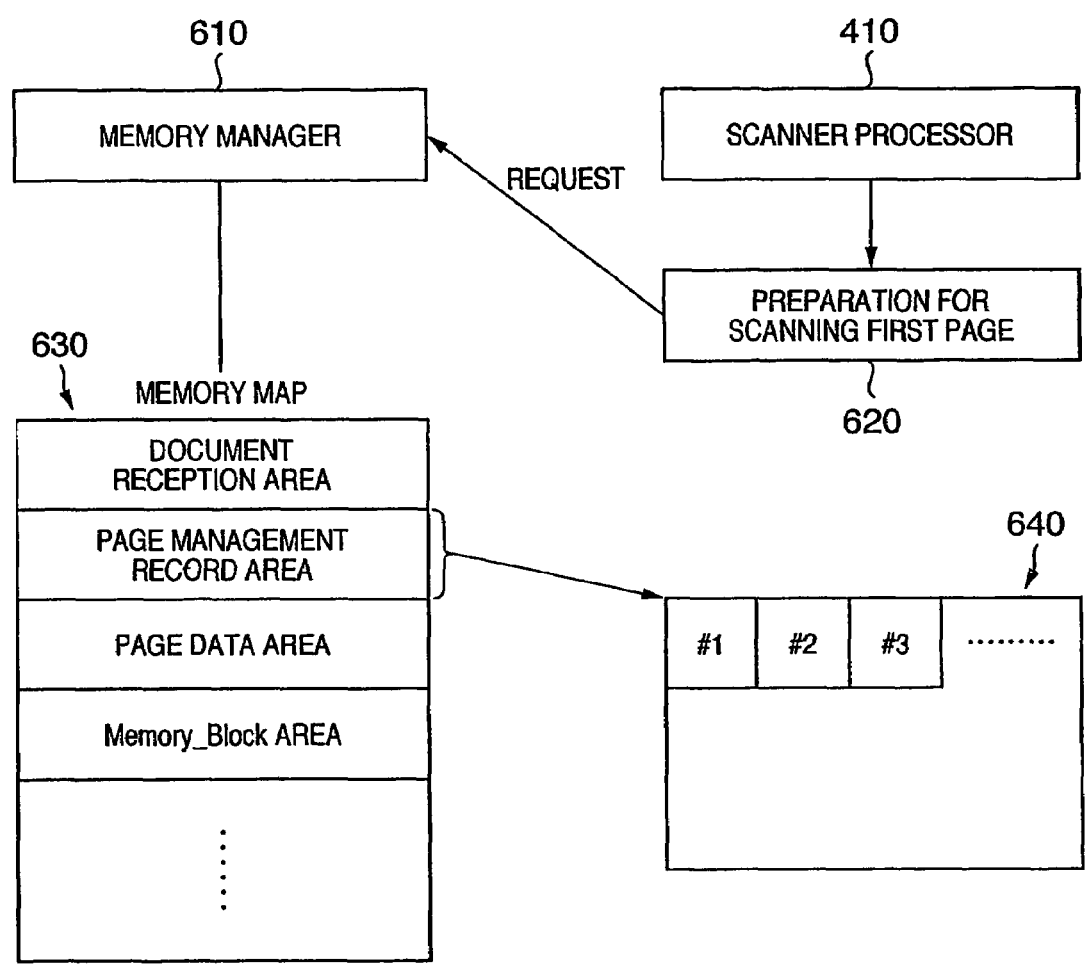
FIG. 9 is a schematic view for explaining an example of a series of operations from data scanning until generation of page management records.

The CPU 101 serves as a system controller, and controls the overall image processing apparatus 100. The ROM 102 stores a control program of the CPU 101. Note that the aforementioned control program is used to implement the embodiment to be described hereinafter. The ROM 102 also stores a memory management program of a memory manager 610 (to be described later; FIG. 9).

The RAM 103 comprises an SRAM, DRAM, or the like, and stores program control variables and the like. The RAM 103 also stores setting values registered by the user of the image processing apparatus 100, management data of the image processing apparatus 100, and the like, and various work buffers.

In this embodiment, a page management record 200 and page data 210 are stored in the RAM 103 every time they are generated, and are deleted from the RAM 103 when a release process is executed.

The scanner 104 comprises a CS image sensor, document feeder mechanism, and the like. The scanner 104 optically scans a document image, and converts it into electrical image data.

The printer 105 prints a received image or file data on a print sheet.

The CODEC 106 is a module for performing encoding and decoding such as JBIG, JPEG, and the like, i.e., a processor for executing compression and expansion processes of image data complying with a predetermined standard.

The operation/display unit 107 comprises a keyboard, touch panel, LCD, LED, and the like. The operation/display unit 107 is used by the apparatus user to make various operations, and displays messages to the apparatus user.

The line I/P 108 comprises a modem (modulator/demodulator), NCU (network control unit), and the like, and performs FAX transmission/reception via a telephone line 109.

The network I/F 110 and USB I/F 112 perform interface control with a connected external PC via a network 111 and USB 113. Job requests such as a print job, scan job, and the like can be received from the PC via these interfaces.

<Page Data Management Method>

FIGS. 4 to 7 are schematic views showing the page data management method according to the present invention. Note that page management records 200a, 200b, 200c, . . . are not already prepared in the RAM 103 but are generated if they are required, and are deleted when they become unnecessary. This operation will be described later.

Figure 4:
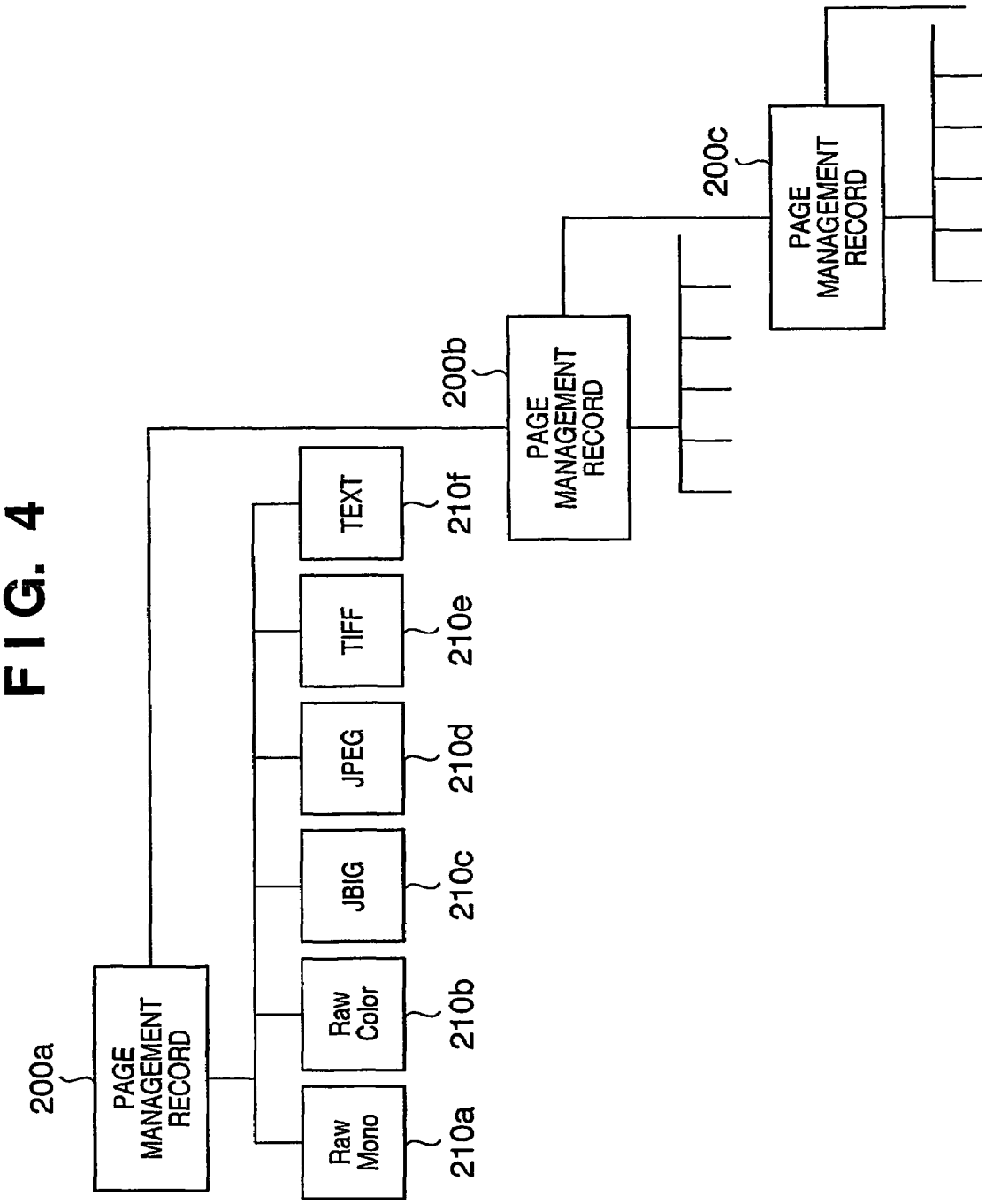
FIG. 4 shows the structure of page management records according to the present invention.

FIG. 4 is a schematic view showing the mutual relationship among the page management records 200a, 200b, 200c, . . . , and also the relationship between one page management record (e.g., 200a) and encoding modes to be managed in that record.

Referring to FIG. 4, a page management record is management data used to manage page data corresponding to respective encoding modes, and stores various kinds of information associated with page data (the detailed structure will be described later). When an image includes a plurality of pages, the page management record saves a pointer to a page management record of the next page, and page management records are associated with each other using a tree structure.

In this embodiment, the page management record can have a plurality of page data of different encoding formats (data formats) such as Raw Mono, Raw Color, JBIG, JPEG, TIFF, TEXT, and the like, as needed.

Figure 5:
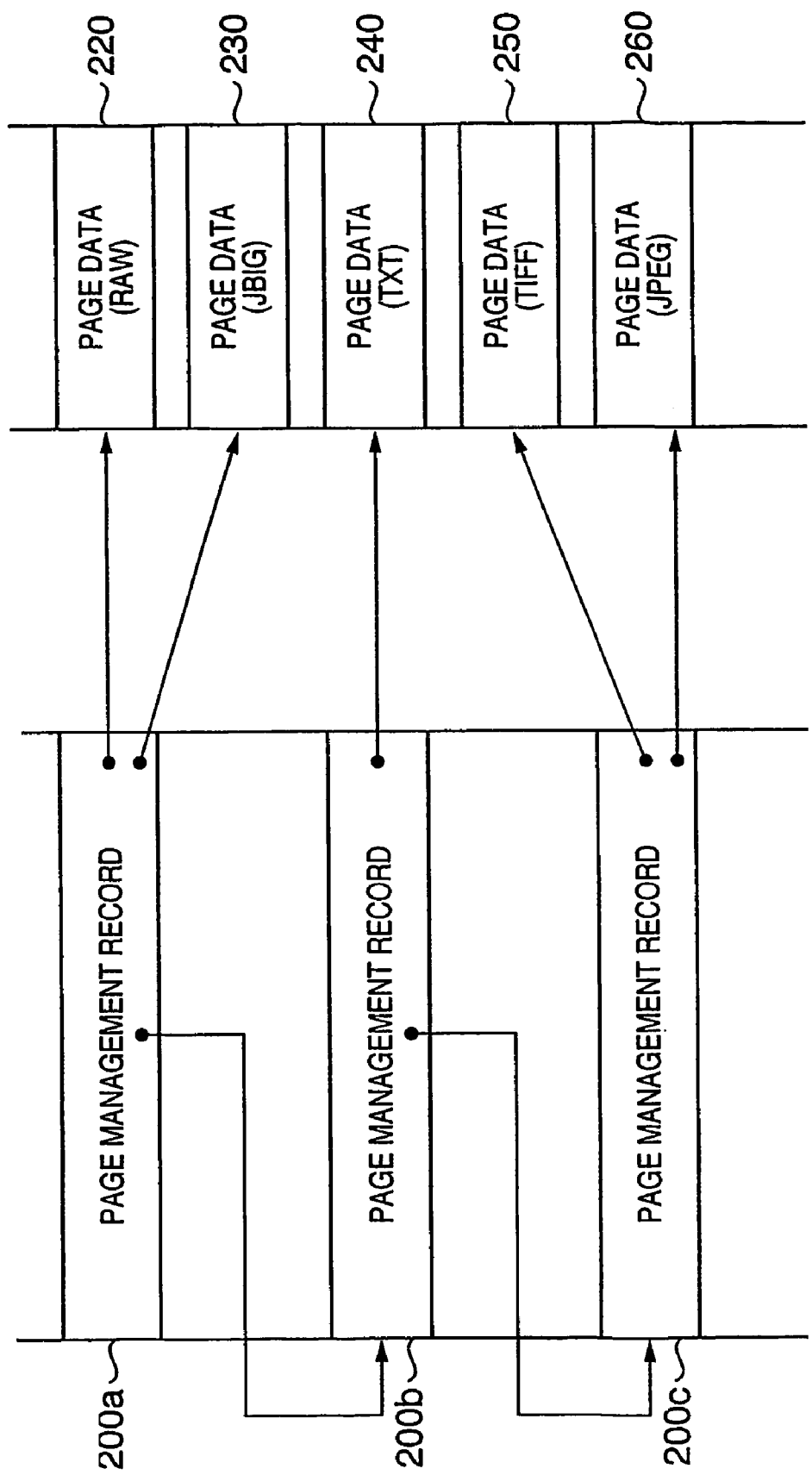
FIG. 5 is a schematic view showing the page data management method using the page management records according to the present invention.

More specifically, each page management record saves pointers to respective page data, as shown in FIG. 5. For example, the page management record 200a for the first page manages RAW page data 220 and JBIG page data 230 of those of supported encoding formats. Each page data stores RAW data and JBIG data at predetermined address positions of a memory block which is managed in association with that page data.

Likewise, the page management record 200b for the second page manages TXT page data 240 associated with text data, and the page management record 200c for the third page manages TIFF page data associated with TIFF data, and JPEG page data associated with JPEG data. Note that these combinations are merely examples, and other combinations are available, as a matter of course.

Figure 6:
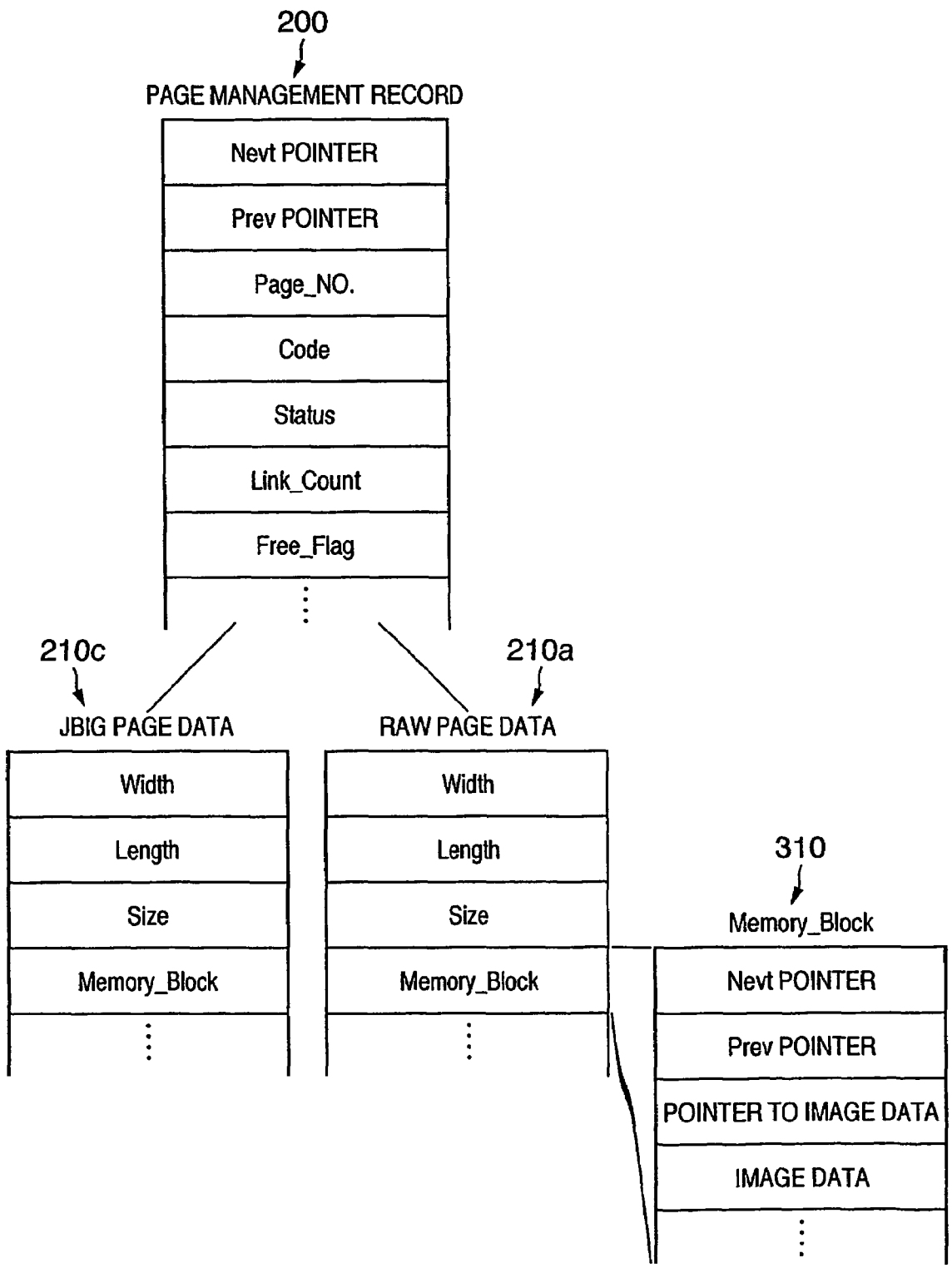
FIG. 6 is a view showing a detailed example of the page data management method using the page management records according to the present invention.

FIG. 6 shows the structure of the page management record 200, and the relationship among the page management record 200, JBIG page data 210c, RAW page data 210a, and Memory_Block 310. A combination of these data formats (encoding formats) is merely an example, and another combination is available.

As shown in FIG. 6, the page management record includes a Next pointer, Prev pointer, Page_No., Code, Status, Link_Count, Free_Flag, and the like. Note that the Next pointer indicates a pointer (address on the RAM 103) of the page management record of the next page, and stores "Null" when no next page is available. The Prev pointer indicates a pointer of the page management record of the previous page, and stores "Null" when no previous page is available (when the page of interest is the first page).

Page_No. is information indicating the page position of a document to be processed of the page of interest. Code is information indicating the encoding formats of data to be managed. In the example of FIG. 6, RAW (raw) data and JBIG data are to be managed.

Status manages two types of information, i.e., the status of the overall page management record 200 and the status of each encoding format. The status includes RUN indicating generation in progress, and FIX indicating completion of generation. For example, when this Status indicates generation in progress of the JBIG page data 210c (RUN), other processors such as a print processor, FAX processor, and the like cannot use that JBIG data, and must stand by until Status indicates completion of generation of the JBIG data (FIX).

Link_Count indicates processors that refer to the page management record 200 of interest. That is, when an arbitrary processor (which can be the print processor or FAX processor) refers to the page management record 200 of interest and is about to use predetermined data managed by that record, this Link_Count counts the number of processors that refer to this record. When none of processors refer to this record, Link_Count is "0".

Free_Flag is set "ON" when reference to the page management record 200 of interest by the processor is complete, and that page management record can be deleted. Therefore, when the Link_Count is "0" and Free_Flag is "ON", it is determined that reference by all the processors is complete, and that page management record 200 can be deleted.

Figure 7:
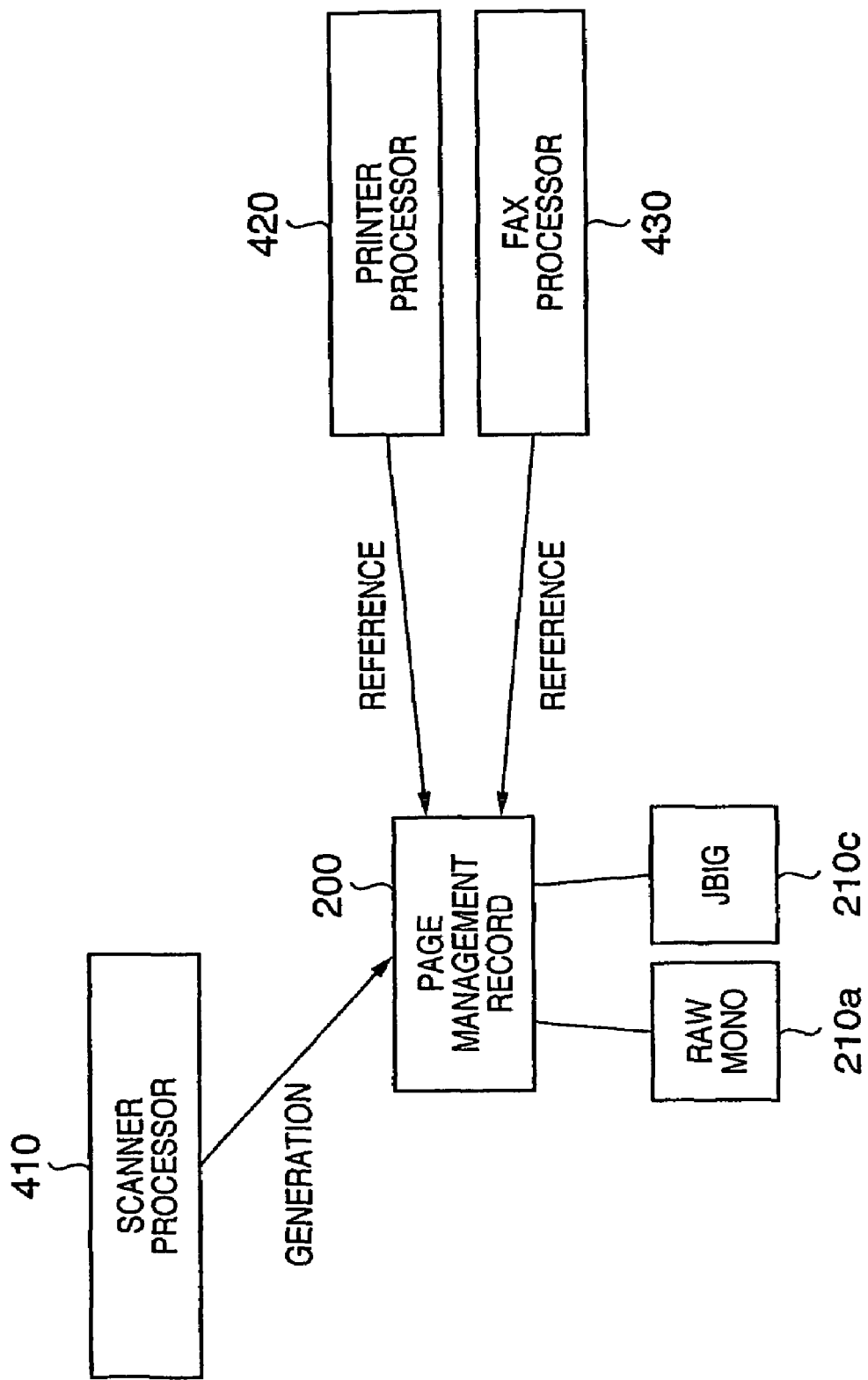
FIG. 7 is a schematic diagram showing the relationship among the page management record, page data, and respective processors according to the present invention.

For the purpose of easy understanding, an operation example associated with Status, Link_Count, and Free_Flag will be described below using FIG. 7. When a document is scanned by a scanner processor 410, a page management record generation request is issued. In this state, Status indicates that the page management record="RUN". As data are scanned by the scanner processor 410, RAW page data are generated, and are stored in an associated memory. Furthermore, JBIG page data are generated, and the RAW data are encoded by JBIG and are stored in the memory. Before these page data are generated and are stored, RAW page data="RUN" or JBIG data="RUN" in Status. After these data are stored, RAW page data="FIX" or JBIG data="FIX" in Status.

In this case, when a printer processor 420 and FAX processor 430 refer to the page management record 200 of interest to use RAW data or JBIG data, Link_Count indicates "2". When both the printer processor 420 and FAX processor 430 have ended reference, Link_Count becomes "0". On the other hand, when the printer processor 420 or FAX processor 430 has ended reference, it issues a delete request (release request) to the page management record 200, and Free_Flag is set "ON" in this case. As described above, when Link_Count="0" and Free-Flag="ON", the role of the page management record 200 of interest is fulfilled, and that record is deleted.

Referring back to FIG. 6, the relationship between the page data and memory block 310 will be explained. As described above, each page management record 200 manages generation and its completion, deletion, and the like of page data 210 for each encoding format. FIG. 6 exemplifies a case wherein RAW data and JBIG data are generated.

Each page data has Width, Length, Size, Memory_Block, and the like as its structure. Note that Width indicates the number of main scan dots of the scanned image, and Length indicates the number of sub-scan dots of that image. Based on these two parameters, the size of the image (X dots×Y dots) can be determined.

Size indicates the data size of the image data. Memory_Block indicates the address of the first memory block 310 where actual data is stored.

In FIG. 6, raw data obtained by scanning image data by the scanner processor 410 is managed by generated RAW page data, and is stored in the memory block 310. Each memory block 310 is formed by, e.g., segmenting the RAM 103 into a plurality of memory areas. Data that cannot be stored in one memory block 310 is also stored in another memory block 310, and these memory blocks are associated by pointers. A Next pointer indicates the next memory block where data is stored, and a Prev pointer indicates the immediately preceding block where data is stored. In this manner, by segmenting the data storage areas, the memory can be efficiently used. Note that FIG. 6 exemplifies a case wherein actual data is stored in the area of the memory block 310. Alternatively, data may be managed by still another memory area, and the memory block 310 may manage only its address pointer.

<Page Data Control Operation>

FIGS. 8 to 13 are flowcharts and the like showing the page data control operation when a monochrome copy process is executed as an example of the image process. Note that the operations of these flowcharts are controlled by the CPU 101.

The page data control method of an image scanner unit upon executing the monochrome copy process will be described below using FIG. 8.

If it is determined in step S501 that a scan start request is issued by the scanner 104 (=410 in FIG. 7), the flow advances to step S502.

In step S502, a page management record 200 is acquired. FIG. 9 shows an overview of this acquisition operation. When the scanner processor 410 begins to scan images, and prepares for scanning the image of the first page (620), a request that instructs to generate a page management record is issued to the memory manager 610. The memory manager 610 is implemented by a software program stored in the ROM 102, and manages the number of current page management records, page management records in use, and the like. Upon reception of the request, the memory manager 610 creates a page management record 200 on a page management record area of a memory map 630. A page management record area 640 is managed for respective page management records (#1, #2, #3, . . . ), and if use of a given page management record ends, that record is released (deleted) from the page management record area 640, and its free area is used for another page management record. In this way, the page management record for the image of the first page is acquired.

Figure 8:
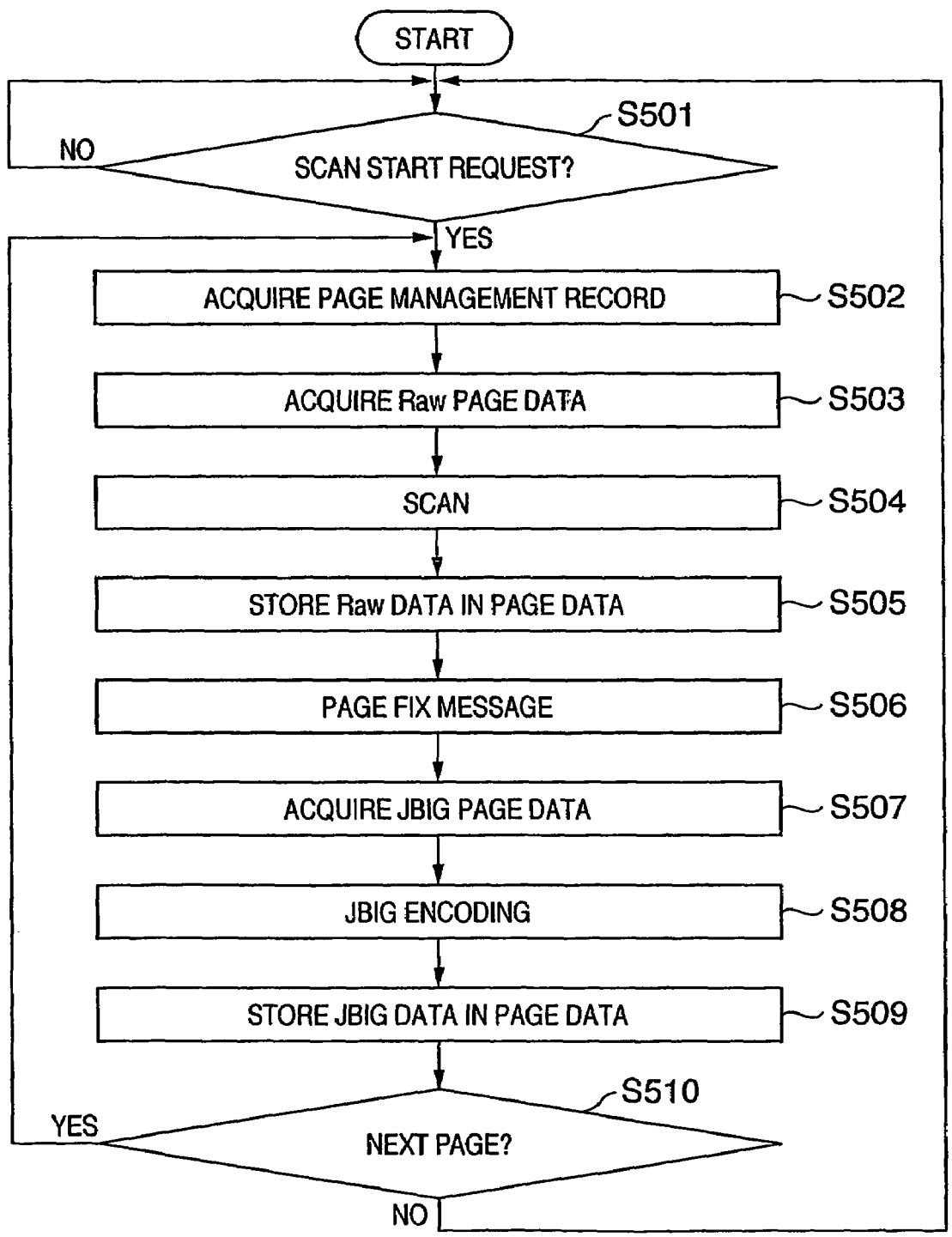
FIG. 8 is a flowchart for explaining the page data generation and management operations using the page management records according to the present invention.

Referring back to the flowchart of FIG. 8, Raw page data is acquired in step S503. After the page management record is acquired, a Raw page data generation request is issued from the scanner processor 410 to the memory manager 610, and Raw page data corresponding to the image data of the first page is generated on a page data area of the memory map 630 in the same manner as in generation of the page management record.

Image data (first page) scanned in step S504 is stored as raw data in a memory block associated with the Raw page data in step S505. At this time, the page management record and Raw page data are acquired, as indicated by 810 and 820 in FIG. 11.

Upon completion of the scan process for one page, a page FIX message is output in step S506. At this time, in Status (FIG. 6) described above, status has changed from "RUN" to "FIX" for Raw data. With this status, other processors (printer processor, FAX processor, and the like) can use this Raw data.

In step S507, JBIG page data is acquired. An overview of this process is indicated by 830 in FIG. 11. In step S508, the Raw page data stored in step S505 is encoded by JBIG. In step S509, JBIG data obtained by encoding the Raw data by JBIG is stored in the JBIG page data acquired in step S507 (840, FIG. 11). At this time, if the Raw page data whose JBIG encoding is complete is not referred to by other processors, that Raw page data can be released (850).

If it is determined in step S510 that the next page is present, the flow returns to step S502, and the processes for the next and subsequent pages similarly continue. If it is determined in step S510 that no next page is present, the flow returns to step S501 to wait for another scan start request. In this way, if a plurality of pages of images are scanned, the memory manager 610 generates page management records in correspondence with the number of pages, and are associated with each other, as shown in FIG. 4.

Figure 10:
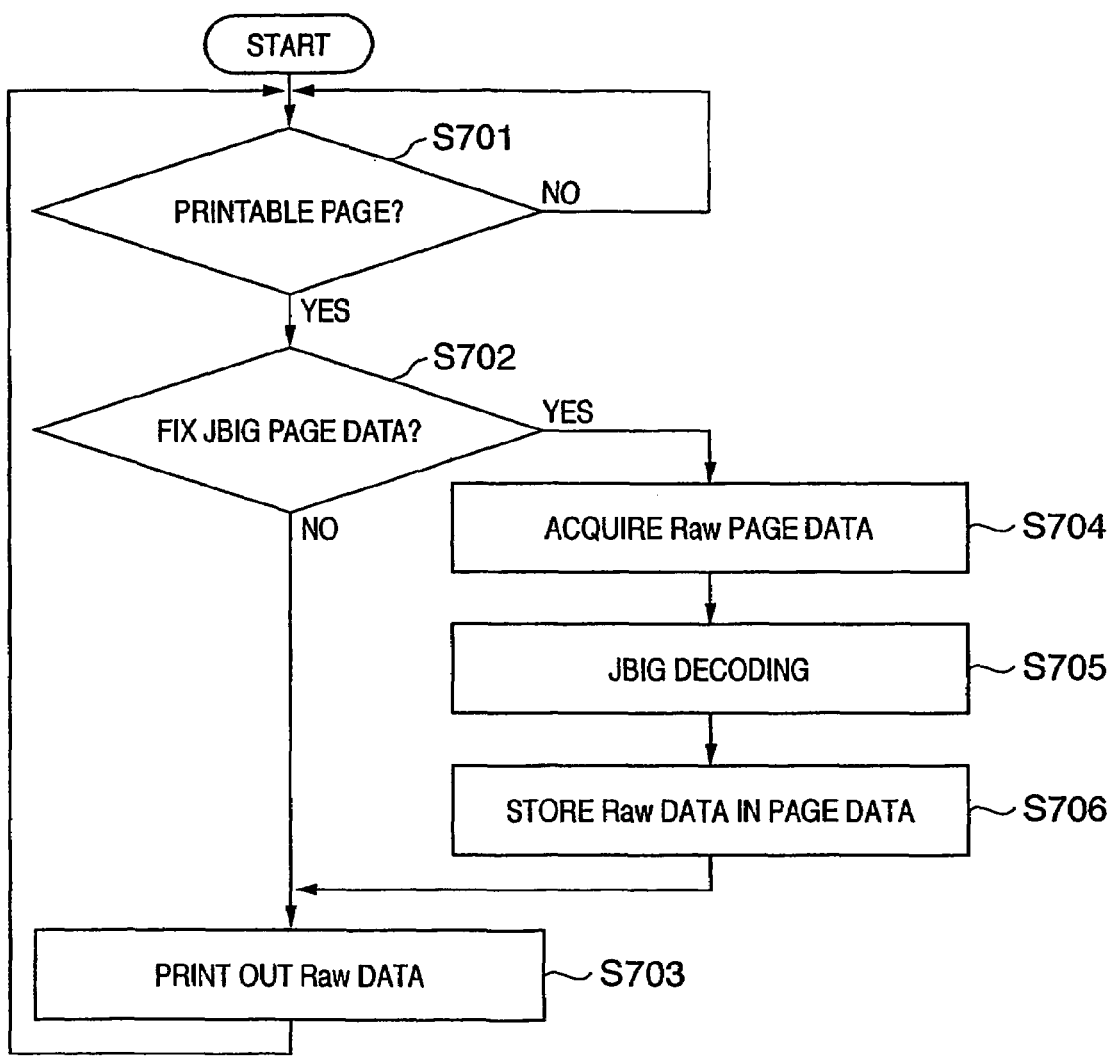
FIG. 10 is a flowchart for explaining an example of the page data control operation using the page management records according to the present invention.
Figure 11:
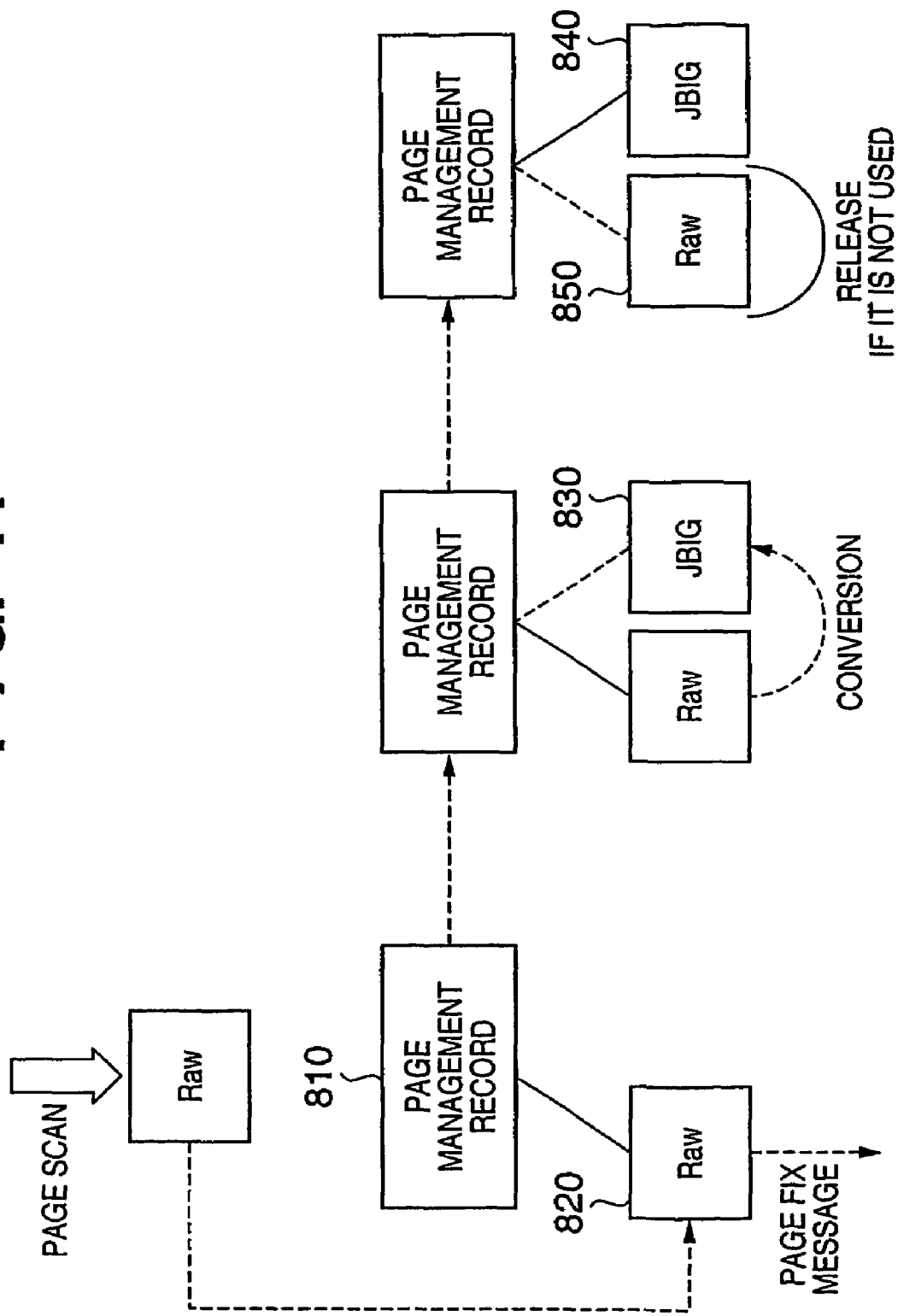
FIG. 11 is a view showing the concept of the page data control operation.

FIG. 10 is a flowchart for explaining the page data control operation of the printer (=420 in FIG. 7) 105 when the monochrome copy process is done as an example.

If it is determined in step S701 that a print process instruction is issued and a printable page is available, the flow advances to step S702.

It is checked in step S702 if "FIX" JBIG page data is available. That is, in case of a normal print operation, since the print operation is executed by decoding JBIG data into Raw data, it is checked first if JBIG data is available.

Figure 12:
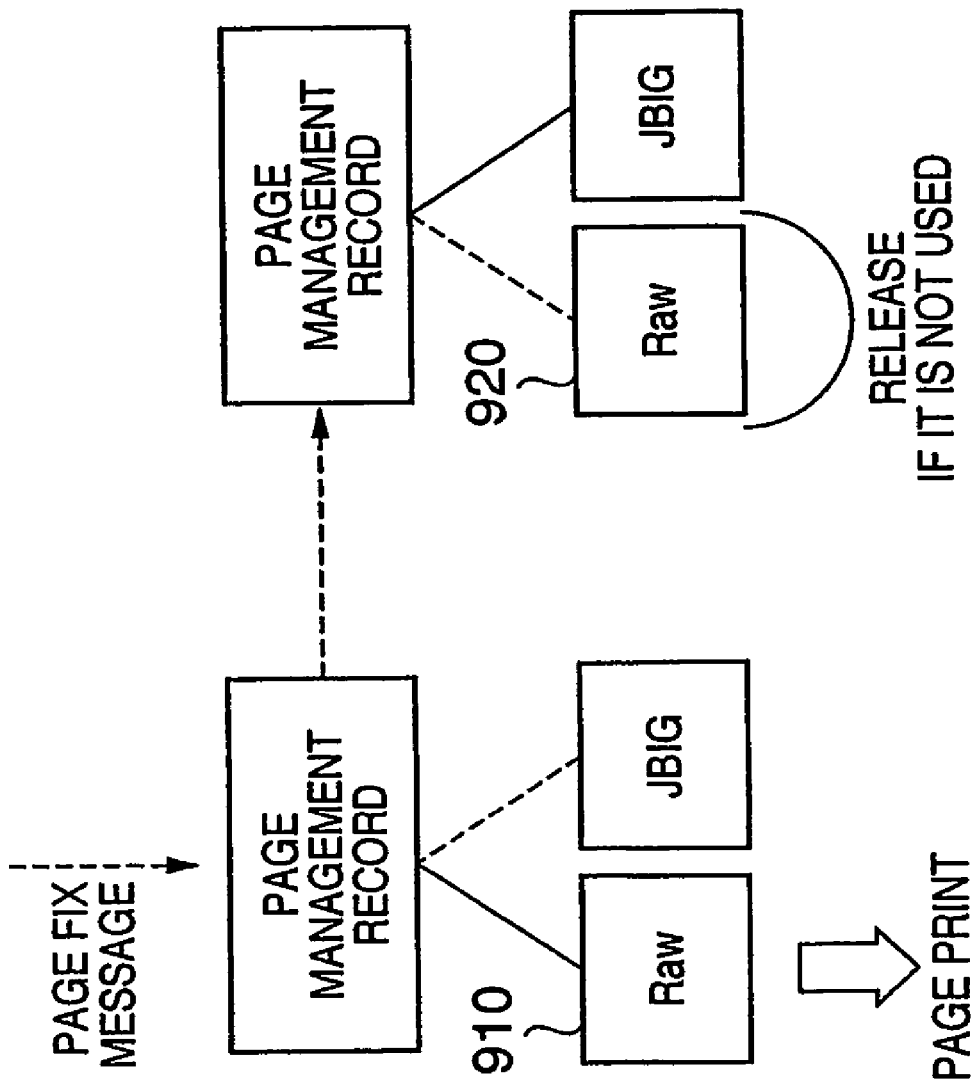
FIG. 12 is a view showing the concept of another page data control operation.

If it is determined in step S702 that no "FIX" JBIG page data is available, Raw data managed by Raw page data is printed out in step S703, and the flow returns to step S701. This phenomenon occurs when the print process of the first page is done. Even when the image of the first page is not encoded by JBIG, since the print process can be executed using Raw data, impression that the high-speed print process is executed can be given to the user. Note that the Raw page data which has been printed out to the printer can be released when it is not referred to by other processors. FIG. 12 shows this state. That is, Raw data managed by Raw page data undergoes a print process, and is sequentially encoded by JBIG. At this time, if JBIG data are stored in memory blocks managed by JBIG data and are not referred to other processors (e.g., the FAX processor and the like), Raw page data is released (deleted from the corresponding page management record), as indicated by 920.

If it is determined in step S702 that "FIX" JBIG page data is available, Raw page data 1010 is acquired, as shown in FIG. 13, in step S704. Since this acquisition operation has already been explained, a description thereof will be omitted.

In step S705, JBIG data managed by the JBIG page data is decoded to generate Raw data.

Next, in step S706 the decoded Raw data is stored in a memory block associated with the Raw page data acquired in step S704.

In step S703, the Raw data stored in the Raw page data is printed out. If the Raw page data corresponding to the Raw data which has been printed out to the printer is not referred to by other processors, that Raw page data can be released (deleted from the corresponding page management record).

The aforementioned operation is repeated until the printout processes for all pages are completed.

EFFECT OF EMBODIMENT

As described above, according to this embodiment, since one page management record has a plurality of page data which are stored in different encoding formats, the output side that requires conversion of an encoding format need not independently have page management records for rendering and page data, the memory diversity can be accommodated, and the memory use size can be reduced. If already "FIX" page data is available, since the processor that uses page data can use that page data even when encoding/decoding is in progress, high-speed processing can be attained.

That is, according to this embodiment, encoding processes corresponding to respective image processing functions can be efficiently implemented while minimizing the memory use size in the apparatus.

OTHER EMBODIMENTS

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-090059 filed on Mar. 25, 2004, the entire contents of which are hereby incorporated by reference herein.

The invention claimed is:

1. A data processing apparatus for output-processing image data for respective pages, comprising:
   a memory for storing page management records and page data;
   a page data management unit constructed to perform a management process for each of respective pages scanned by an image reader, wherein the management process comprises:
   creating a page management record for each of the respective pages and storing the page management record in the memory, wherein the page management record corresponds to a respective page scanned by the image reader,
   generating a first type of page data and a second type of page data and storing the first and second types of page data in the memory, wherein the first type of page data includes RAW image data representing the respective page and the second type of page data includes image data generated by encoding the RAW image data included in the first type of page data,
   writing a memory address of the first type of page data and a memory address of the second type of page data to the page management record for the respective page,
   managing respective output processes by a first output unit and a second output unit referring to the created page management record to process the first type of page data or the second type of page data, and
   maintaining on the page management record, a link count that counts a number of output units that refer to the page management record and a flag that indicates whether reference to the page management record by output units is complete,
   deleting the first type of page data from the page management record in response to determining that the link count is zero for the first type of page data and in response to the flag indicating completion of the reference by both the first and second output units to the first type of page data, and
   a control unit constructed to perform a control process for each of said respective pages scanned by the image reader, wherein the control process comprises:
   monitoring completion of storing the first type of page data scanned by the image reader in the memory,
   encoding the RAW image data included in the first type of page data in response to the completion of storing, and
   determining whether or not image data resulting from encoding the RAW image data exists,
   wherein if the resultant image data does not exist, the control unit controls the first output unit to output the RAW image data,
   wherein if the resultant image data does exist, the control unit decodes the resultant image data into RAW image data, and controls the first output unit to output the decoded RAW image data, and
   wherein if the second output unit is not referring to the RAW image data of which the first output unit completes an output, the control unit deletes the RAW image data of which the first output unit completes the output.

2. The data processing apparatus according to claim 1, wherein the first output unit is a printer and the second output unit is a FAX.

3. A data processing method for output-processing image data for respective pages, comprising:
   a page data management step performed for each of respective pages scanned by an image reader, wherein the page data management step includes at least the steps of:
   creating a page management record for each of the respective pages and storing the page management record in a memory, wherein the page management record corresponds to a respective page scanned by the image reader,
   generating a first type of page data and a second type of page data and storing the first and second types of page data in the memory, wherein the first type of page data includes RAW image data representing the respective page and the second type of page data includes image data generated by encoding the RAW image data included in the first type of page data,
   writing a memory address of the first type of page data and a memory address of the second type of page data to the page management record for the respective page,
   managing respective output processes by a first output step and a second output step referring to the created page management record to process the first type of page data or the second type of page data,
   maintaining on the page management record, a link count that counts a number of output units that refer to the page management record and a flag that indicates whether reference to the page management record by output units is complete,
   deleting the first type of page data from the page management record in response to determining that the link count is zero for the first type of page data and in response to the flag indicating completion of the references by both the first and second output steps to the first type of page data, and
   a control step performed for each of the respective pages scanned by the image reader, wherein the control step includes at least the steps of:
   monitoring completion of storing the first type of page data in the data memory, encoding the RAW image data included in the first type of page data in response to the completion of storing, and
   determining whether or not image data resulting from encoding the RAW image data exists,
   wherein if the resultant image data does not exist, the control step controls the first output step to output the RAW image data,
   wherein if the resultant image does exist, the control step decodes the resultant image data into RAW image data, and controls the first output step to output the decoded RAW image data, and
   wherein if the second output step is not referring to the RAW image data of which the first output step completes an output, the control step deletes the RAW image data of which the first output step completes the output.

4. The data processing method according to claim 3, wherein the first output step comprises outputting using a printer, and the second output step comprises outputting using a FAX.

* * * * *